United States Patent [19]

Halvorsen et al.

[11] Patent Number: 4,754,922

[45] Date of Patent: Jul. 5, 1988

[54] AIRBLAST FUEL INJECTOR TIP WITH INTEGRAL CANTILEVER SPRING FUEL METERING VALVE AND METHOD FOR REDUCING VAPOR LOCK FROM HIGH TEMPERATURE

[75] Inventors: Robert M. Halvorsen, Birmingham; Jerome R. Bradley, Sterling Heights; Gregory F. Long, Canton, all of Mich.

[73] Assignee: Ex-Cell-O Corporation, Troy, Mich.

[21] Appl. No.: 889,015

[22] Filed: Jul. 24, 1986

[51] Int. Cl.$^4$ .......................... B05B 7/10; B05B 7/06
[52] U.S. Cl. ........................... 239/5; 239/406; 239/410; 239/417.3; 239/424.5; 137/513.5
[58] Field of Search ............... 239/400, 402, 405, 406, 239/464, 410, 412, 5, 416.5, 417.3, 424, 424.5, 425, 408, 416.1, 570, 571, 413, 423, 474, 533.2; 60/740-742; 137/855, 860, 513.5; 431/187

[56] References Cited

U.S. PATENT DOCUMENTS

| | | | |
|---|---|---|---|
| 2,107,998 | 2/1938 | Rullison | 137/855 |
| 2,574,865 | 11/1951 | Edwards | 239/464 X |
| 2,893,647 | 7/1959 | Wortman | 60/741 X |
| 3,310,240 | 3/1967 | Grundman | 239/400 X |
| 3,598,321 | 8/1971 | Bobzin | 239/400 |
| 3,684,186 | 8/1972 | Helmrich | 239/400 |
| 3,980,233 | 9/1976 | Simmons et al. | 239/400 |

FOREIGN PATENT DOCUMENTS 1775973  5/1973  Fed. Rep. of Germany ...... 137/855

Primary Examiner—Andres Kashnikow
Assistant Examiner—Kevin Patrick Weldon
Attorney, Agent, or Firm—Edward J. Timmer

[57] ABSTRACT

The airblast fuel injector capable of accommodating high fuel temperature at the injector tip without deleterious fuel vaporization problems and resultant combustion instability in a gas turbine engine includes an annular spring valve mounted on an annular shoulder of an inner injector body forming an inner air chamber with the valve having a cantilever valve head for controlling fuel flow from a fuel swirling orifice in the shoulder near the injector tip. The spring bias of the cantilever valve head is adjusted by lapping the valve head prior to fastening the spring valve to the inner injector body and before the inner injector body is assembled within an outer injector body having means forming an outer annual fuel chamber and air chamber. The method involves valving the fuel flow in the injector tip near to the fuel discharge orifice in a valve closed manner below a selected minimum fuel pressure and in a valve metering manner above the selected fuel pressure with valving located sufficiently upstream therefrom that the airblast operational characteristics of the injector are not adversely affected.

12 Claims, 4 Drawing Sheets

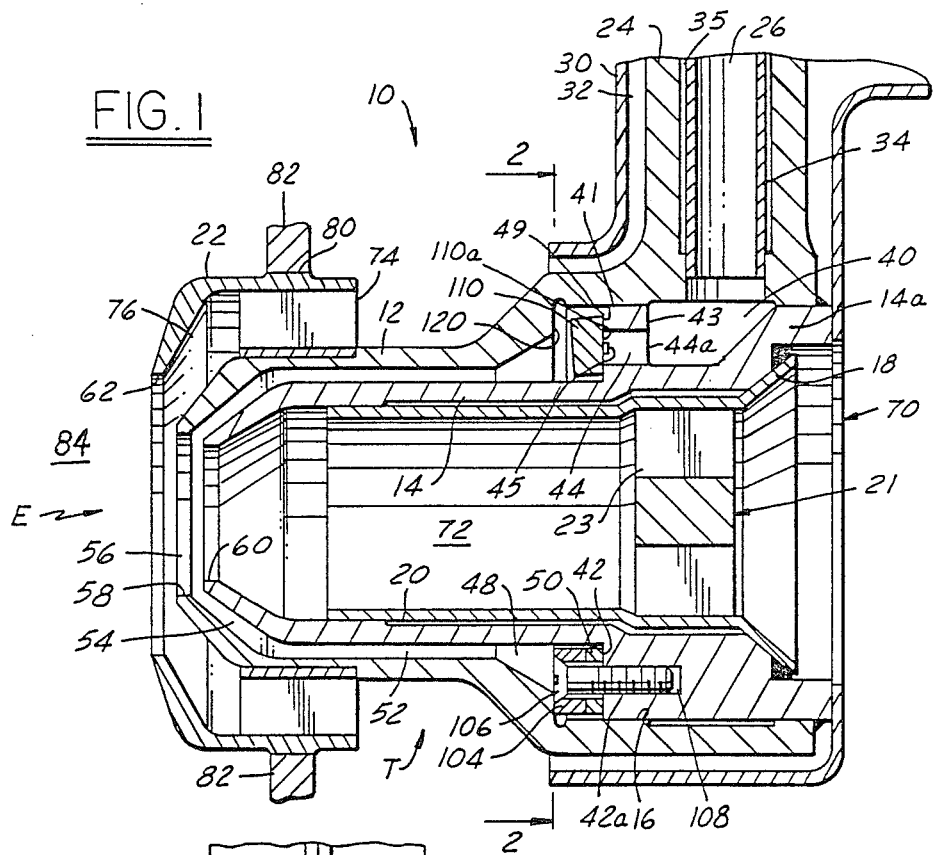
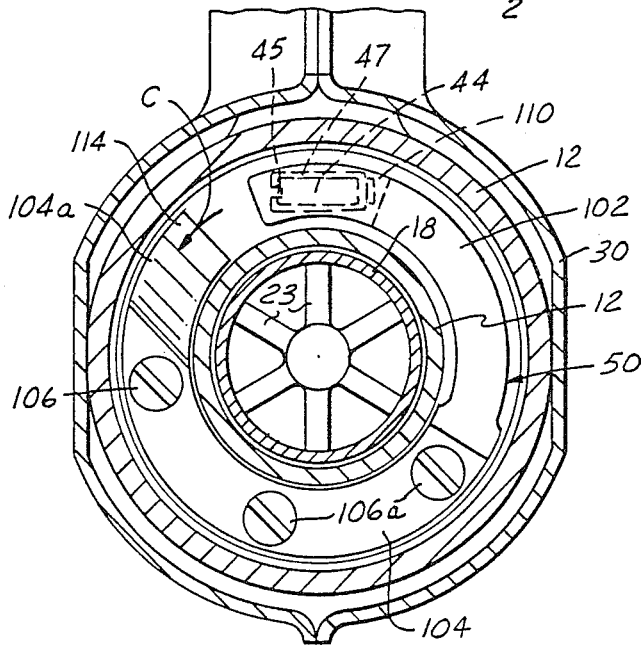

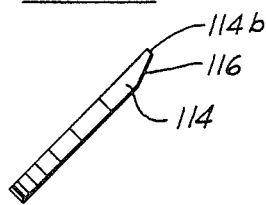
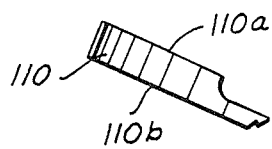
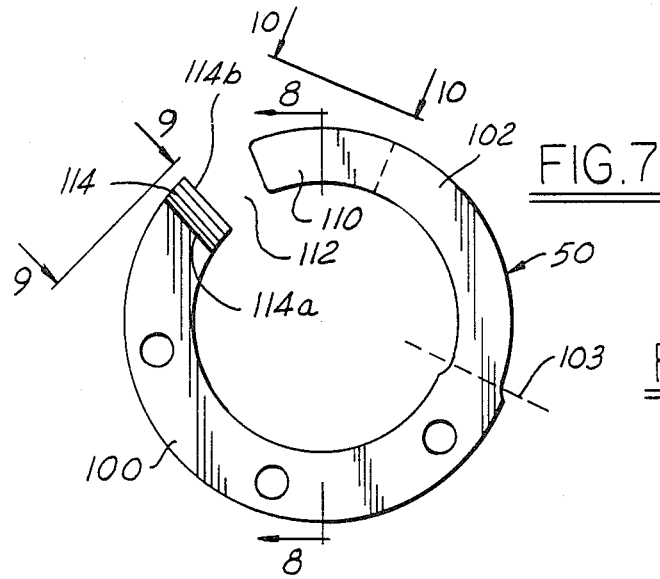
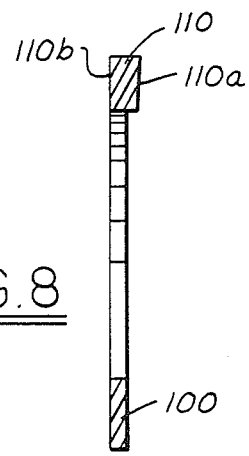
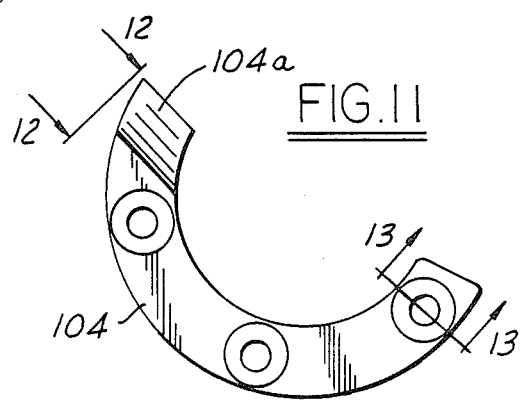
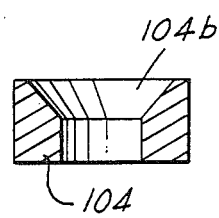

AIRBLAST FUEL INJECTOR TIP WITH INTEGRAL CANTILEVER SPRING FUEL METERING VALVE AND METHOD FOR REDUCING VAPOR LOCK FROM HIGH TEMPERATURE

FIELD OF THE INVENTION

The invention relates to airblast fuel injector constructions and methods for vapor lock prevention for gas turbine engines and, in particular, airblast fuel injector constructions having a special valving configuration in the injector tip and near the injector discharge for providing a high pressure drop for fuel near the injector discharge end for reducing fuel vaporization in the fuel passages upstream from the valving caused by high temperatures.

BACKGROUND OF THE INVENTION

U.S. Pat. No. 3,684,186 issued Aug. 15, 1972, to William F. Helmrich discloses in FIG. 2 a known airblast fuel injector for gas turbine engines wherein the injector has generally concentric chambers for inner and outer air flows and intermediate fuel flow and generally concentric discharge orifices for discharging and intermixing inner and outer air flows and the fuel flow. U.S. Pat. No. 3,980,233 issued Sept. 14, 1976, to Harold C. Simmons illustrates an airblast fuel injector of similar construction for a gas turbine engine. Because of the typical low pressure drop of airblast type injectors, prior art airblast injectors have employed a fuel metering valve in a housing on the opposite end of an injector support strut considerably upstream from the injector tip and outside the combustor case such that back pressure is maintained to a valve which is considerably upstream from the injector tip. These multiple fuel metering valves have been required to compensate for pressure head effect to provide adequate fuel distribution to the engine combustor as a result of the low back pressure tips of the airblast injectors used. The low fuel back pressure at the airblast injector tip, actually from the remote upstream fuel valve to the injector tip, makes the fuel downstream of the valve prone to vaporization when fuel temperature increases as explained in the next paragraph. In addition, the fuel passages downstream from the metering valve to the injector tip are circuitous and often small in size, being prone to vapor lock with adverse consequences as will be explained in the next paragraph.

Recently, there has been an effort to increase the power (thrust) and efficiency of gas turbine engines especially for military use by raising operating temperature of the hot gas generated in the combustor for subsequent flow to the turbine and past the engine outlet. Although airblast fuel injectors of the type shown in FIG. 2 of the Helmrich U.S. Pat. No. 3,684,186 have performed satisfactorily in the current gas turbine engine where fuel temperature is about 250° F. at the injector tip, initial tests of the same fuel injectors in higher temperature engines where fuel temperature at the injector tip is within the range of 300° F. to 400° F. have evidenced a problem of fuel vaporation in the fuel passages downstream from the fuel metering valve and at the injector tip from the higher temperatures involved. The fuel vaporization results in vapor lock condition in the fuel passages causing pulsing or intermittent interruptions in fuel flow from the injector which in turn causes combustion instability and adversely affects operation of the engine.

U.S. Pat. No. 3,598,321 issued Aug. 10, 1971, to Darrel G. Bobzin illustrates a fuel injector construction for a gas turbine engine having multiple rectilinear leaf spring valves carried on a cylindrical valve plate with each leaf spring valve received in a chordal type slot in the valve plate for controlling fuel flow between cylindrical passages extending from the outer periphery to an inner cylindrical bore in the valve plate. However, the fuel injector disclosed is not an airblast fuel injector and is not exposed to higher fuel temperatures associated with recently developed engines.

U.S. Pat. No. 2,107,998 issued Feb. 8, 1938, to E. A. Rullison describes an air valve carburetion device wherein a flexible annular reed valve is held on a supporting disk and against a valve seat to control air flow to an engine and is opened by a vacuum condition in the carburetor.

SUMMARY OF THE INVENTION

The invention contemplates a method for reducing fuel vaporization in an airblast injector tip and resultant combustion instability in a gas turbine operating in a manner to promote higher fuel temperatures in the injector tip by valving the fuel flow in a valve closed manner below a selected fuel pressure and in a valve metering manner above the selected fuel pressure at an axial location in the injector tip near and upstream of the fuel discharge orifice to reduce fuel vaporization upstream of the axial valving location. Importantly, the upstream axial location of such fuel valving is selected to be a sufficient distance upstream from the fuel discharge orifice to provide for formation of a fuel stream at the fuel discharge orifice amenable to the airblast effect of an inner air stream whereby fuel vaporization in the injector tip is reduced without adversely affecting the airblast operational characteristics of the injector.

The invention also contemplates in a typical embodiment an airblast fuel injector for recently developed higher temperature gas turbine engines wherein the injector includes an inner air chamber, outer air chamber and an annular fuel chamber or passage between the air chambers at the injector tip and further includes means on the injector tip for forming an annular shoulder in the fuel passage closing off the fuel passage except for a fuel aperture configured to impart swirl to fuel flowing therethrough in a general circumferential direction relative to the longitudinal axis of the injector body and an annular spring valve having a free cantilever end overlying and biased against the fuel aperture for controlling fuel flow from the aperture in response to changes in fuel pressure in the fuel passage upstream thereof. By virtue of its location on the injector tip adjacent the discharge end the spring valve increases the pressure drop available for fuel atomization and concomitantly substantially reduces fuel vaporization and vapor lock when the inpector is used in the high temperature engines.

In a preferred embodiment of the invention, an inner injector body includes a hollow downstream small diameter portion and upstream large diameter portion with the large diameter portion having a fuel receiving chamber in its outer periphery extending only part way around the circumference of the large diameter portion, the fuel-receiving chamber forming an outer circumferential flange with a downstream and upstream shoulder. A relatively large fuel slot extends through the flange at an angle to impart swirl to the fuel flowing therethrough and a small fuel slot extends from the large fuel slot downstream to meter a small fuel flow even when the spring valve is closed against a valve seat on the downstream shoulder.

In another preferred embodiment of the invention, another end of the spring valve is fixedly mounted on the downstream shoulder of the flange and is spaced circumferentially from the cantilever end. The fixed end has a tapered profile decreasing in thickness circumferentially toward the free cantilever end to provide a ramp over which swirling fuel passes downstream. An annular retainer member overlying the fixed non-flexing end of the spring valve includes a similar circumferentially extending tapered end disposed circumferentially from the free cantilever end of the spring valve and is fastened to the annular shoulder by machine screws whose heads are recessed in the retainer member.

BRIEF DESCRIPTION OF THE DRAWINGS

FIG. 1 is a longitudinal cross-sectional view through a fuel injector of the invention.

FIG. 2 is a sectional view of the fuel injector along lines 2—2 of FIG. 1.

FIG. 7 is an end elevation of the spring valve 50.

FIG. 8 is a cross-sectional view along lines 8—8 of FIG. 7.

FIG. 9 is an elevational view along lines 9—9 of FIG. 7.

FIG. 10 is an elevational view along lines 10—10 of FIG. 7.

FIG. 11 is an end elevation of the retainer ring.

FIG. 12 is an elevational view along lines 12—12 of FIG. 11.

FIG. 13 is a cross-section view along lines 13—13 of FIG. 11.

DESCRIPTION OF PREFERRED EMBODIMENTS

Figure 4:
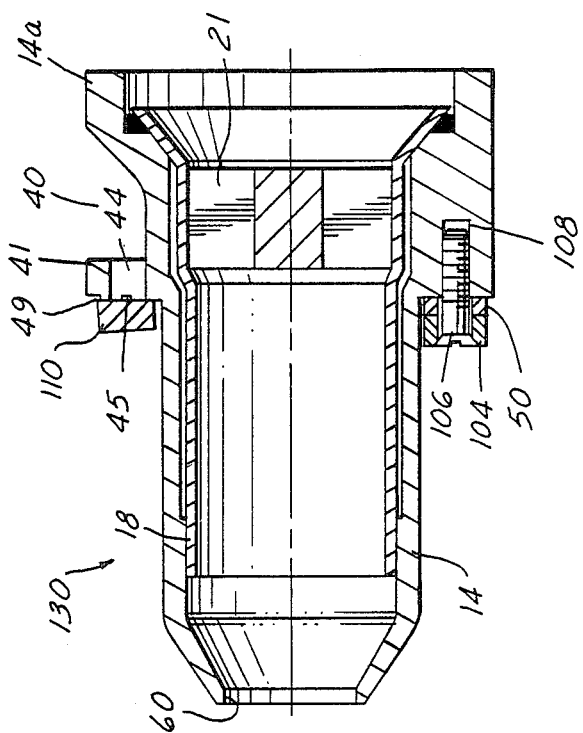
FIG. 4 is a longitudinal cross-sectional view of the subassembly of inner injector body and valve spring.
Figure 3:
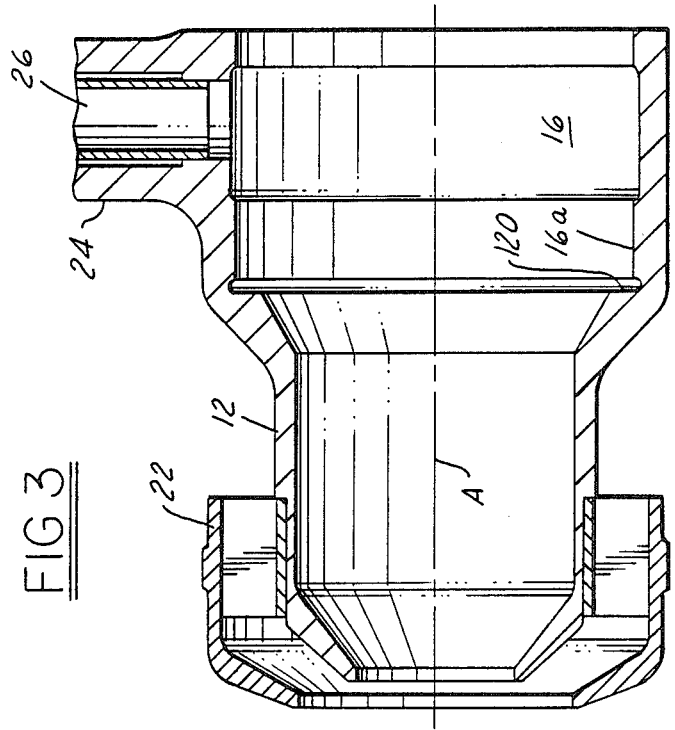
FIG. 3 is a longitudinal cross-sectional view of the outer injector body.
Figure 5:
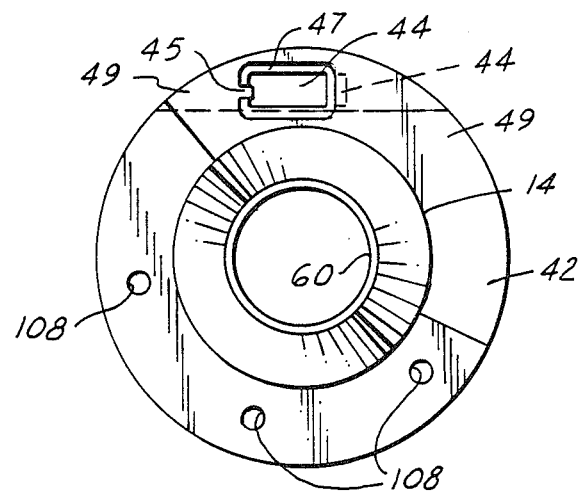
FIG. 5 is an end elevation of the inner injector body.

FIG. 1 illustrates an airblast type of fuel injector for a higher temperature gas turbine engine with a injector tip T constructed in accordance with the invention to provide higher fuel pressure drop and reduced fuel vaporization from fuel temperatures in the general range of 300° F. to 400° F. at the injector tip.

The fuel injector tip includes an outer injector body 12 and inner injector body 14 with the latter received in a longitudinal bore 16 in the former. A tubular heat shield body 18 is attached as by welding or other means inside the inner injector body 14 to provide a heat insulating dead air space 20. An air swirler member 21 having swirl vanes 23 is disposed fixedly in the heat shield body 18. A tubular outer shroud 22 is attached as by welding or other means on the exterior of the outer injector body 12 for purposes to be explained.

As is apparent, the outer injector body and inner injector body are tubular in shape. Outer injector body 12 includes lateral tubular extension or support strut 24 which includes a fuel passage 26 for receiving pressurized fuel from a fuel pump (not shown) in known manner. As is known, the support strut includes a mounting flange at the end opposite from the fuel injector tip for attachment to a casing of the engine to support the injector tip as shown in FIG. 1 relative to the combustor and terminates at the opposite end in a fitting for connection a fuel line. An external heat shield 30 is attached around extension 24 to provide air space 32. Similarly, an internal heat shield sleeve 34 is attached in fuel passage 26 to provide heat insulating air space 35.

The inner and outer injector bodies 12,14 include generally cylindrical cross-section tubular portions along their lengths extending toward the discharge end E of the fuel injector, the cylindrical portions being generally concentric relative to longitudinal axis A of the injector. As will be described, various fuel chambers and passages are formed between the nested cylindrical portions of the inner and outer injector bodies and shroud 22.

In FIG. 1, inner and outer injector bodies 12,14 define a fuel chamber 40 machined predominantly in the inner injector body with fuel chamber 40 being in fuel flow relation to fuel passage 26 to receive fuel therefrom. The fuel chamber 40 extends only partially around the circumference of the large diameter end portion 14a to form an arcuate outer circumferential flange 41 thereon. From FIGS. 4 and 6, it is apparent that large diameter annular end portion 14a of the inner injector body is machined to form the recess or chamber 40 in the otherwise solid annular end portion.

Figure 6:
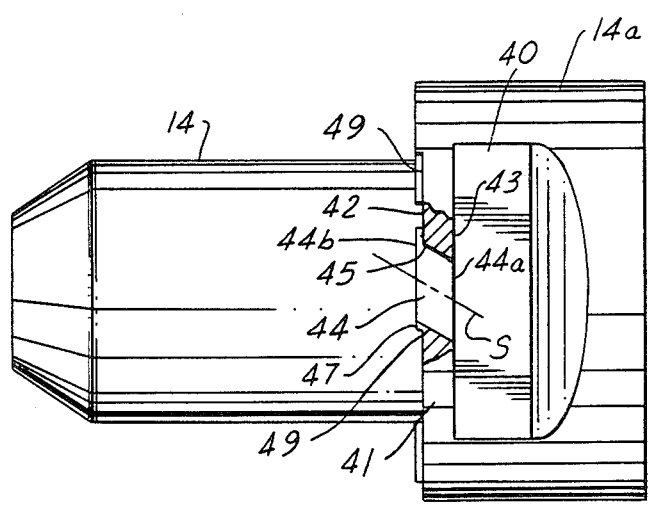
FIG. 6 is an top elevation of FIG. 5.

Inner injector body 14 includes a downstream-facing annular shoulder 42 and a cylindrical outer periphery 42a on portion 14a to nest and sealingly engage against cylindrical bore wall 16 in the outer injector body. Of course, the shoulder could be provided on outer injector body 12. In the vicinity of fuel chamber 40, there is an upstream transverse or radial second shoulder 43 on flange 41 with a single fuel aperture or slot 44 interconnecting the shoulders 42,43 and being in fuel flow relation with fuel chamber 40. Fuel slot 44 is configured with axis S inclined relative to axis A when viewed in plan, as best seen in FIG. 6, to impart a generally circumferential swirl to fuel flowing therethrough. In particular, the fuel aperture or slot 44 is oriented in an angular direction relative to axis A through arcuate flange 41 and includes inlet opening 44a in shoulder 43 and outlet opening 44b in shoulder 42 with the inlet opening displaced transversely relative to the outlet opening so that fuel slot 44 extends at a transverse angle between shoulders 42,43 relative to the longitudinal axis A. As a result fuel flowing from outlet opening 44b will tend to flow and swirl counterclockwise and circumferentially in FIG. 2 in the direction of arrow C as it travels downstream of the fuel slot 44 into annular converging conical fuel chamber 48.

Fuel flow from fuel aperture or slot 44 is controlled by an annular spring valve 50 mounted on annular shoulder 42 for seating against raised valve seat 47 as will be described in greater detail hereinbelow.

As shown, a smaller transversely extending slot 45 is machined from slot 44 through the axially raised annular valve seat 47 on shoulder 42 to adjacent recessed areas 49 such that the slot 45 is always open and places chamber 40 and downstream fuel passages to be described in fuel flow relation. Slot 45 meters a low rate fuel flow to the downstream fuel passages when the spring valve 50 is seated and closed against valve seat 47. Slot 45 is self-cleaning in that once the spring valve 50 is opened, the high flow rate of fuel therepast will cleanse the smaller slot 45 of any dirt or foreign matter.

As mentioned, fuel flow from fuel slot 44 swirls tangentially or circumferentially in converging conical chamber 48 from which the fuel then flows to annular chamber 52 and then to annular conical swirl chamber 54 for discharge through orifice 56 past annular fuel discharge lip 58 in the form of a fuel spray cone.

As the fuel spray cone discharges from lip 58, it is intermixed with inner and outer air discharging past inner and outer air discharge lips 60,62, respectively. Inner air discharging from lip 60 enters the upstream end 70 of inner injector body 14 and flows through cylindrical longitudinal bore 72 in the inner injector body. Air swirler 21 imparts swirl to the inner air flow in known manner. Outer air discharging past outer air discharge lip 62 enters upstream end 74 of the outer air shroud 22 and passes through air swirling chamber 76 for discharge past lip 62. As is known, the air received in the inner injector body 14 and shroud 22 is received from the upstream compressor (not shown) of the gas turbine engine. Typically, outer shroud 22 includes a mounting surface 80 which is adapted to engage the combustor wall 82 downstream of the compressor so that the fuel and inner and outer air flows are discharged into the internal combustor chamber 84 for burning.

The annular spring valve 50 for controlling fuel flow from fuel slot 44 is shown in detail in FIGS. 4-10 as well as FIGS. 1-2. As shown, the spring valve 50 is annular and includes a fixed portion 100 and somewhat narrower flexing cantilever portion 102 which flexes along flexing line 103. Fixed portion 100 is fixedly mounted on annular shoulder 42 by C-shaped retainer member 104 and multiple (three) machine screws 106. Screws 106 are threaded into individual threaded bores 108 extending longitudinally into shoulder 42 and inner injector body 14. The thickness of the spring valve 50 is uniform except at the free end of the cantilever portion 102 where an enlarged (in the thickness direction) head 110 is provided. As shown best in FIG. 8, valve head 110 includes a seat surface 110a which is slanted or sloped at an angle and relative to the plane of the spring valve 50 when free or unengaged with valve seat 47 of shoulder 42. As will be explained, this seat surface 110a is lapped or otherwise abrasively machined to adjust the spring bias exerted by the spring valve 50 against valve seat 47 to positively metal-to-metal seal thereagainst and to adjust for desired cracking or opening fuel pressure for the valve. Head 110 also includes a downstream control surface 110b adapted to abut shoulder 120 on the outer injector body 12 to limit the maximum opening of the spring valve 50 at maximum fuel pressure.

A slot 112 in the valve spring 50 separates the cantilever valve head 110 from the tapered end 114 of the fixed portion 100 which end 114 is spaced circumferentially from head 110. The tapered end 114 has a decreasing thickness from full thickness at line 114a to reduced thickness at free end 114b as shown best in FIG. 9. This tapered end 114 provides an inclined ramp 116 extending circumferentially away from valve head 110 in the circumferential direction relative to the longitudinal axis A and over which fuel discharging from outlet opening 44b passes without interference to its flow direction and swirl.

Retainer member 104 includes a tapered end 104a similarly tapered as end 114 of the spring valve for the same purpose. Heads 106a of machine screws 106 are recessed in counterbores 104b in the retainer member for the same purpose.

The spring valve 50 is made of a resilient material, such as INCONEL X750 or 17-7PH stainless steel, and, when formed into the shape shown in the figures and having seat surface 110a abutted against shoulder 42, exerts a spring bias of the valve head 110 against valve seat 47 of shoulder 42 to prevent fuel flow, except through slot 45. The spring bias is adjusted by lapping or abrasively removing material from seat surface 110a to in effect vary the thickness of the valve head. The spring bias correlating with a desired minimum fuel pressure for valve cracking or opening is thereby provided. Once the spring valve opens, a linear relationship of fuel flow rate with fuel pressure throughout the operational fuel pressure range of the fuel injector is provided by the spring valve shown. In manufacture of the fuel injector shown, the inner injector body 14 is assembled with the spring valve 50 and retainer 104 prior to insertion into the outer injector body 12. Prior to fastening to inner body 14, the spring valve 50 is precalibrated by lapping or other abrasive removal process with respect to seat surface 110a. A precalibrated subassembly or cartridge 130, FIG. 4, of the inner injector body and spring valve fastened thereto is thereby provided. Upon insertion in the outer injector body 12, the precalibrated subassembly is secured in position by brazing or by other means.

In accordance with the method of the invention, the axial position of annular shoulder 42 and annular spring valve 50 along the longitudinal axis A of the injector tip T is located to valve fuel flow in the injector tip in a valve closed manner below a selected minimum fuel pressure (valve cracking pressure) and in valve metering mode above that fuel pressure with the axial location of valving being spaced upstream from discharge end E (fuel discharge orifice 56) a selected sufficient axial distance to allow the desired airblast effects on the fuel stream at the fuel discharge orifice, e.g., air filming or atomization action on the fuel on discharge lip 58 at fuel discharge orifice 56, which is essential for satisfactory performance of an airblast fuel injector, and in addition enhanced fuel distribution around the fuel discharge orifice at low fuel flow rates. In particular, inner air flow past discharge lip 60 must be allowed to film or atomize fuel on lip 58 and also by virtue of low pressure generated in fuel chamber 54 from high velocity inner air flow past lips 60 and 58, to improve distribution of fuel in chamber 54, i.e., annularly therearound, at low fuel flow rates where fuel tends to fill chamber 54 in a non-uniform manner dictated by gravity effects. As a result, the axial location of the spring valve 50 and fuel aperture 44 is selected upstream from discharge end E as shown to permit inner air flow past lip 60 to perform its intended functions in the airblast injector.

The axial location of the spring valve 50 and fuel slot 44, and thus valving of the fuel flow, are also important at higher fuel flow rates where the fuel discharging from the fuel slot has a high tangential velocity component with the fuel stream, as a result, tending to immediately form multiple individual fingers of fuel which, if allowed to be present at lip 58, would interfere with or adversely affect filming (atomization) of the fuel by the inner air stream. To provide a fuel stream more amenable in terms of its velocity and configuration to filming or atomization at lip by inner air flow, the axial location of valve 50 and fuel slot 44 are spaced sufficiently upstream to allow the tangential velocity component of fuel flow to decrease while the axial velocity component increases to reduce the fuel finger effect and provide a swirling, annular fuel stream discharging from orifice 56 which is satisfactory for filming by the inner air flow from lip 60 as well as outer air flow from lip 62.

Thus, the axial location of the spring valve 50 and fuel aperture 44 on shoulder 42, and thus of valving of the fuel flow in the valve closed manner below a selected fuel pressure and valve metering manner above that fuel pressure are important to enable the objects of the invention to be achieved without adversely affecting the airblast operational characteristics of the fuel injector.

In addition to axially locating the spring valve 50 and fuel slot 44 in the selected axial position, fuel passages downstream from the valve 50 are sized to facilitate egress of any fuel vapor generated therein, especially during low fuel flow rate operation, and thereby avoid vapor lock in the passages. Of course, the axial positioning of the spring valve 50 and fuel slot 44 also shorten the length of the fuel passages downstream thereof so that fuel vapor has a shorter distance to travel for expellation from the discharge end to also avoid vapor lock therein.

Positioning of the spring valve 50 on shoulder 42 of the injector tip T near the fuel discharge orifice substantially reduces fuel vaporization problems and associated vapor lock upstream thereof by maintaining a higher fuel pressure in the injector tip upstream of the spring valve and by shortening the distance between the discharge end E and spring valve 50 to facilitate egress of any vapor that might be generated through the relatively uncomplicated and direct-path fuel chambers 48,52,54 to the combustor chamber.

The injector construction described hereinabove is simple in design with resultant low cost, has improved reliability as no sliding parts with close tolerances are used with less susceptibility to contamination with the valve open and exhibits ease of maintenance since the inner injector body with spring valve thereon can be replaced by another precalibrated assembly. A lower cost and lighter weight fuel injector is thereby provided for a gas turbine engine.

While certain specific and preferred embodiments of the invention have been described in detail hereinabove, those skilled in the art will recognize that various modifications and changes can be made therein within the scope of the appended claims which are intended to include equivalents of such embodiments.

We claim:

1. An airblast fuel injector having injector body means for forming an inner air chamber having a downstream air discharge orifice, an outer air chamber having a downstream air discharge orifice and an annular fuel passage between the inner and outer air chambers with a downstream fuel discharge orifice between the air discharge orifices and for forming an upstream annular shoulder closing off the fuel passage and having a fuel aperture in the shoulder, an annular spring valve on the shoulder having a cantilever valve head overlying the fuel aperture and biased against the shoulder over the fuel aperture when fuel pressure is below a minimum selected value and openable against spring bias when fuel pressure exceeds the selected value to allow fuel flow discharge in swirling fashion from the fuel aperture to the annular fuel passage.

2. The fuel injector of claim 1 wherein the valve head has an enlarged thickness adjusted to establish the spring bias for effecting opening at the minimum selected value of fuel pressure.

3. The fuel injector of claim 1 herein the fuel aperture comprises a large slot and small slot extending therefrom and wherein the valve head closes off the large slot when engaged against the shoulder and the small slot remains open to allow fuel flow therethrough when the valve head is seated against the shoulder.

4. The fuel injector of claim 1 wherein the injector body means also forms a downstream shoulder spaced from the annular shoulder and against which the valve head abuts to limit its maximum opening.

5. The fuel injector of claim 1 wherein the spring valve includes a fixed portion attached to the annular shoulder and wherein the fixed portion terminates in a tapered end circumferentially spaced from the valve head in the direction of fuel flow from the fuel aperture and over which fuel flows.

6. The fuel injector of claim 5 further having a retaining member overlying the fixed portion of the annular spring valve and fixedly attached to the annular shoulder to fixedly mount the fixed portion of the spring valve thereon.

7. The fuel injector of claim 6 wherein the retainer member includes a tapered end adjacent the tapered end of the fixed portion and over which fuel flow passes from the fuel aperture.

8. The fuel injector of claim 1 wherein the fuel aperture includes an upstream inlet opening and downstream outlet opening over which the valve head is disposed with the inlet opening and outlet opening being relatively displaced to impart swirl to fuel flow therethrough.

9. The fuel injector of claim 3 wherein the annular shoulder includes a raised valve seat around the large slot extending from a downstream face of the shoulder and the small slot extends from the large slot through a side of the raised valve seat to the downstream face of the shoulder to thereby always be open even when the spring valve is engaged against the valve seat.

10. The fuel injector of claim 1 wherein the injector body means includes an inner injector body with a downstream small diameter hollow portion and an upstream large diameter hollow portion with said annular shoulder between the small and large diameter portions.

11. The fuel injector of claim 10 wherein the large diameter hollow portion includes a fuel-receiving chamber extending partially therearound to form an arcuate flange between said shoulder and fuel-receiving chamber, said fuel aperture extending through said flange to provide a fuel flow path from the fuel-receiving chamber.

12. A method for reducing fuel vaporization in an airblast injector tip disposed on a gas turbine engine combustor from a support strut wherein elevated fuel temperature is experienced in the injector tip comprising:

forming a fuel stream in the injector tip and discharging the fuel stream from a fuel discharge orifice on the injector tip, forming an inner air stream and discharging the inner air stream inside the fuel stream from an inner air discharge orifice so that the inner air stream atomizes fuel discharging from the fuel discharge orifice and at low fuel flow rate also improves fuel stream distribution around the fuel discharge orifice in an airblast effect on the fuel stream at the fuel discharge orifice, said forming of the fuel stream including valving a fuel flow forming the fuel stream in a valve closed manner below a selected fuel pressure and in a valve metering manner above the selected fuel pressure at an axial location in the injector tip upstream of the fuel discharge orifice to reduce fuel vaporization upstream thereof in the injector tip and support strut with the axial location selected a spaced distance upstream from the fuel discharge orifice to provide a fuel stream at the fuel discharge orifice amenable to the airblast effect of the inner air stream whereby fuel vaporization in the injector tip is reduced without adversely affecting the airblast operational characteristics of the injector tip.

* * * * *

UNITED STATES PATENT AND TRADEMARK OFFICE
CERTIFICATE OF CORRECTION

PATENT NO. : 4,754,922

DATED : July 5, 1988

INVENTOR(S) : Robert M. Halvorsen, Jerome R. Bradley and Gregory F. Long

It is certified that error appears in the above—identified patent and that said Letters Patent is hereby corrected as shown below:

Line 14, change "annual" to --annular--.

Column 2, line 58, change "inpector" to --injector--.
Column 4, line  5, after "connection" insert --to--.
Column 6, line 64, after "lip" insert --58--.
Column 8, line  1, change "herein" to --wherein--.

Signed and Sealed this

Nineteenth Day of February, 1991

Attest:

HARRY F. MANBECK, JR.

Attesting Officer

Commissioner of Patents and Trademarks